United States Patent [19]

Komata

[11] Patent Number: 4,791,759
[45] Date of Patent: Dec. 20, 1988

[54] GRINDING WHEEL POSITION DETECTING MEANS FOR SURFACE GRINDING MACHINE

[75] Inventor: Kazuharu Komata, Ikeda, Japan

[73] Assignee: Daisyo Seiki Kabushiki Kaisha, Osaka, Japan

[21] Appl. No.: 61,525

[22] Filed: Jun. 15, 1987

[30] Foreign Application Priority Data

Mar. 23, 1987 [JP] Japan .................. 62-68505

[51] Int. Cl.$^4$ ............................................. B24B 49/00
[52] U.S. Cl. ........................ 51/165.87; 51/165.92; 51/105 SP; 73/37.6
[58] Field of Search .......... 51/165 R, 165.87, 165.88, 51/165.92, 105 SP, 238 GG; 73/37.6

[56] References Cited

U.S. PATENT DOCUMENTS

| | | | |
|---|---|---|---|
| 3,079,740 | 3/1963 | Fallon ........................ | 51/165 R X |
| 3,090,171 | 5/1963 | Stimson ...................... | 51/165 R |
| 3,220,244 | 11/1965 | Donnelly ..................... | 73/37.6 |
| 3,232,096 | 2/1966 | Bruizel ....................... | 73/37.6 |
| 3,682,191 | 8/1972 | Lechner ...................... | 73/37.6 X |
| 3,754,433 | 8/1973 | Hyer .......................... | 73/37.6 |
| 3,975,864 | 8/1976 | Glowacki ..................... | 51/165.87 |
| 3,976,089 | 8/1976 | Carlnäs et al. ............... | 73/37.6 X |
| 4,073,184 | 2/1978 | Collins ....................... | 73/37.6 |
| 4,502,253 | 3/1985 | Lorenzi et al. ............... | 51/165.92 X |

*Primary Examiner*—Frederick R. Schmidt
*Assistant Examiner*—Shirish Desai
*Attorney, Agent, or Firm*—Armstrong, Nikaido, Marmelstein & Kubovcik

[57] ABSTRACT

A grinding wheel position detecting means for a surface grinding machine, in which a super-grain grinding wheel is composed of a base metal fastened to a longitudinal end portion of a rotating shaft and a super-grain layer provided on a longitudinal end face of said base metal, and a longitudinal end face of the super-grain layer is utilized as a grinding surface.

6 Claims, 2 Drawing Sheets

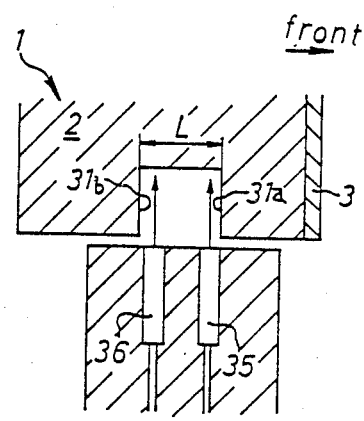
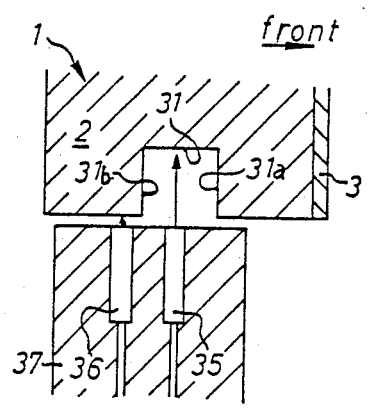
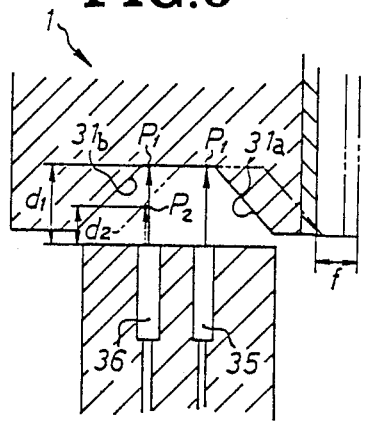
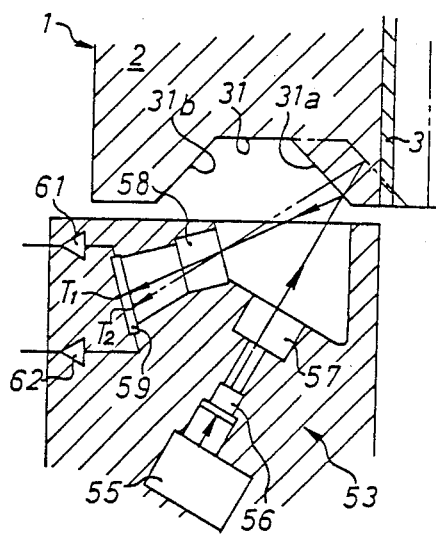

GRINDING WHEEL POSITION DETECTING MEANS FOR SURFACE GRINDING MACHINE

BACKGROUND OF THE INVENTION

Industrial Useful Field

This invention relates to a grinding wheel position detecting means for a surface grinding machine, in which a super-grain grinding wheel is composed of a base metal fastened to a longitudinal end portion of a rotating shaft and a super-grain layer provided on a longitudinal end face of said base metal, and a longitudinal end face of the super-grain layer is utilized as a grinding surface.

Prior Art

Generally, a change in a longitudinal position of grinding surface during grinding is caused by a wear of the grinding surface incurred by grinding work and an elongation of a rotating shaft due to thermal expansion, which produce changes in dimensions of workpiece.

If a position of a grinding surface of grinding wheel can be measured consecutively and finely in terms of such changes of dimensions of workpiece in an in-process manner, a control of dimensions of workpiece will become easy in association with a fine adjustment means of wheel shaft and a range of application of the grinding machine will be widened drastically.

For this reason, the following grinding wheel position detecting means have conventionally been developed.

(1) A means for detecting grinding wheel position, in which a touch probe of a measuring device is made touch to a grinding surface of grinding wheel and the position is detected by its movement. (Patent Publication No. 45-1392)

(2) A means for detecting grinding wheel position, in which liquid or air is sprayed on a surface of grinding wheel and the position is detected by its pressure change. (Patent Publication (Kokai) No. 49-104290, Patent Publication No. (Kokai) 53-115993)

(3) A means for directly measuring a wear of grinding surface of grinding wheel by a movement of an optical sensor such as a laser beam etc. (Patent Publication No. (Kokai) 55-128095)

However, since the grinding surface of grinding wheel is directly measured in all the foregoing conventional means, the following troubles have arisen.

In the means as described in the above article (1), the touch probe itself is worn out by the grinding surface of rotating grinding wheel so that a continuance of correct measurement is very difficult. Further, a large quantity of coolant or ground chips strike against the touch probe to cause a failure of correct measurement.

In the means as described in the above article (2), the air sprayed from a measuring nozzle is disturbed by coolant or ground chips so that a measuring error will be induced.

In the means as described in the above article (3), the laser beam will be disturbed or screened by coolant or ground chips. Further, it is necessary to install a very complicated and precise mechanism in a grinding field so that a cost-up will become inevitable.

OBJECT OF THE INVENTION

In recent years, the super-grain grinding wheel utilizing super grains such as diamond, borazon etc. has frequently been used, and such super-grain grinding wheel develops little wear in its grinding surface to such an extent that a wear of grinding wheel gives little influence on finished dimensions at least during a grinding process of about one lot. Consequently, it may be considered that the thermal expansion of rotating shaft is the only factor in the change of grinding wheel position which can affect dimensions of workpiece.

In consideration of an improvement in wear-resistance owing to an increasing use of the foregoing super-grain grinding wheel, an object of the present invention is to provide a grinding wheel position detecting means, which enables correct measurements and arouses little trouble, by installing its measuring part in a place scarcely affected by coolant and ground chips.

STRUCTURE OF THE INVENTION

In order to accomplish the above object; in a surface grinding machine wherein a super-grain grinding wheel is composed of a base metal fastened to a longitudinal end portion of a rotating shaft and a super-grain layer provided on a longitudinal end face of said base metal, and a longitudinal end face of the super-grain layer is utilized for a grinding surface; an annular groove is formed on an outer peripheral surface of the base metal, a sensor measuring a longitudinal position of the annular groove is disposed in a manner as radially outwardly facing on said annular groove with a space leaving therebetween, and a grinding wheel position is detected by measuring the position of the annular groove.

FUNCTION

A change in longitudinal position of the outer peripheral annular groove of the base metal is measured by the sensor to detect a change in grinding surface position of grinding wheel due to a thermal expansion of rotating shaft.

Since the grinding surface itself is not directly measured, coolant or ground chips scarcely strike against the sensor so that a correct measurement always becomes possible during grinding work and the sensor will hardly be damaged by the ground chips.

BRIEF DESCRIPTION OF THE DRAWINGS

FIG. 3 is an enlarged sectional view of III part of FIG. 1 showing an optimum position of grinding wheel.

FIG. 4 is an enlarged sectional view of the same part as FIG. 3 showing a deviated position of grinding wheel.

FIG. 5 and FIG. 6 are enlarged sectional views of the same part as FIG. 3 showing another embodiments respectively.

DETAILED DESCRIPTION OF THE INVENTION

Embodiment

Figure 1:
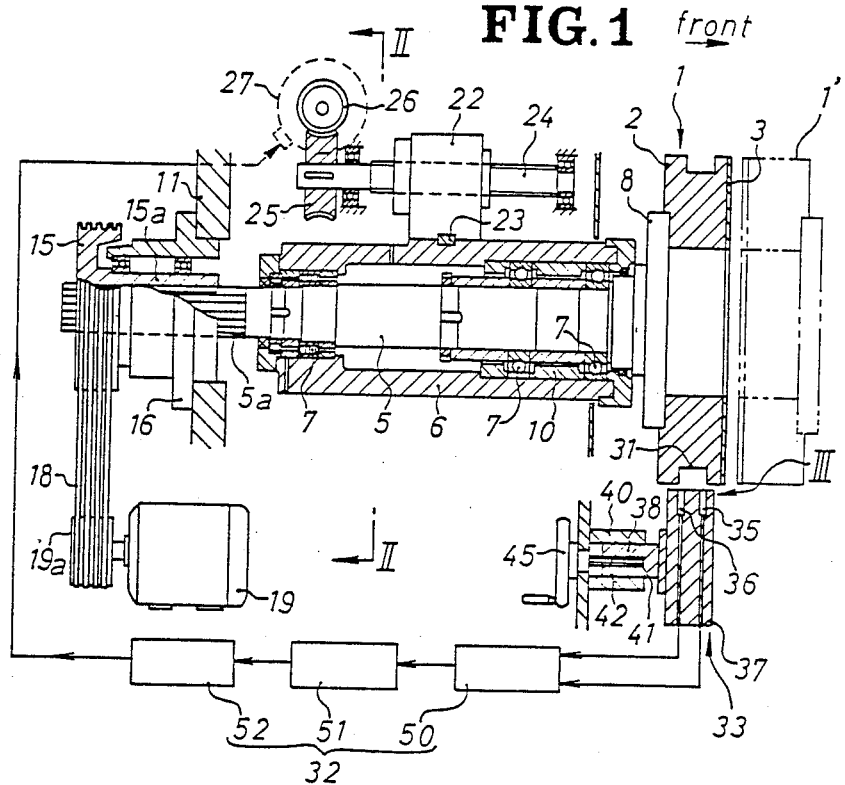
FIG. 1 is a schematic vertical sectional view of a surface grinding machine according to the invention.

FIG. 1 shows the schematic vertical sectional view of the surface grinding machine according to the present invention. In FIG. 1, a grindstone (grinding wheel) 1 is composed of an annular thick base metal 2 and a super-grain layer 3. The base metal 2 is fastened in a detachable manner to a longitudinal one end of a horizontal rotating shaft 5, for example a flange 8 at its front end. The super-grain layer 3 is composed of supergrains such as a diamond or a borazon etc., and formed into an uniform thickness on a longitudinal front end face of the base metal 2 by means of electrocoating for example. A front end face of this super-grain layer 3 is utilized for a grinding surface.

The rotating shaft 5 is carried in a cylindrical rotating shaft holder 6 through bearings 7, so that it is freely rotatable relatively to the rotating shaft holder 6 and at the same time movable in its longitudinal direction together with the rotating shaft holder 6 by the help of a stopper sleeve 10 etc.

An outer peripheral spline part 5a is formed on a rear end of the rotating shaft 5, and said spline part 5a spline fits axially movably in an inner peripheral spline part of a cylindrical part 15a of a pulley 15. The pulley 15 is carried rotatably by an inner peripheral surface of a bearing case 16 through bearings, and the bearing case 16 is fastened to a surface grinding machine body 11. The pulley 15 is interconnected to and driven by a rotating drive motor 19 through belts 18 and a driving pulley 19a, and the rotating shaft 5 is driven when the drive motor 19 rotates.

Figure 2:
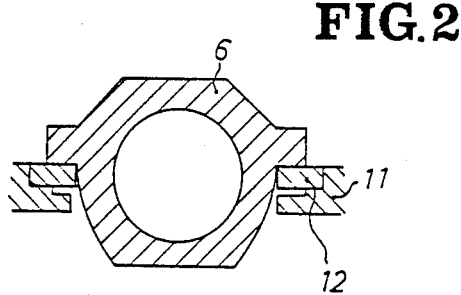
FIG. 2 is an enlarged sectional view taken on a line II—II of FIG. 1.

The rotating shaft holder 6 is installed, as shown by FIG. 2, on a guide rail 12 of the grinding machine body 11 in a manner as not rotatable but slidable in a longitudinal direction.

A ball screw holder 22 is linked through a key 23 to an upper end of the rotating shaft holder 6 as illustrated by FIG. 1, and the ball screw holder 22 is screwed through balls onto a ball screw 24 which is parallel with the rotating shaft.

The ball screw 24 is rotatably carried by the grinding machine body 11 and at the same time integrally equipped with a worm wheel 25 at its rear end, and the worm wheel 25 meshes with a worm 26 of a fine adjustment drive motor 27. Namely, the ball screw 24 is driven through the worm 26 and the worm wheel 25 when the drive motor 27 rotates; thereby the screw holder 22, the rotating shaft holder 6 and the rotating shaft 5 can be moved integrally in the longitudinal direction.

A grinding wheel control signal processing means 32 and a grinding wheel position detecting means 33 forming an element of the invention are connected to said motor 27.

The grinding wheel position detecting means 33 comprises a pair of first and second sensors 35 & 36 and an annular groove 31 etc. The annular groove 31 is formed into such a rectangular section as having a specified longitudinal width on a radially outer peripheral surface of the base metal 2. The sensors 35 & 36 are disposed in such a manner that they are spaced each other with approximately same longitudinal distance as the width of the annular groove 31 left therebetween, and at the same time they face on the annular groove 31 at a distance from a radial outside. The both sensors 35 & 36 are supported by a sensor holder 37, and a shaft part 38 of the sensor holder 37 is fitly supported by a boss part 40 of the grinding machine body 11 in an axially sliding manner. Female threads 41 are formed at a wheel center of the shaft part 38 and male threads 42 of a sensor position adjusting hand wheel 45 are screwed into said female threads 41, thus longitudinal positions of the sensors 35 & 36 can be adjusted by turning the hand wheel 45.

In FIG. 3 showing the enlarged sectional view of the sensor, air gauges are used for the sensors 35 & 36 and measuring air is sprayed from tip ends of the sensors 35 & 36 to a center of the grinding wheel respectively for enabling a detecting circuit 50 of the signal processing means 32 to detect a change of its air pressure. When the grinding wheel 1 changes its position toward the front as illustrated in FIG. 4, for example, the second sensor 36 deviates from the annular groove 31 to an outer peripheral surface of the base metal and an air pressure of the second sensor thereby becomes higher, but an air pressure of the first sensor 35 does not change.

In FIG. 1, the processing means 32 is equipped with said detecting circuit 50, a computing circuit 51 and a correcting circuit 52. The detecting circuit 50 has a function to detect changes in air pressures of the sensors 35 & 36, to determine which sensor has changed the air pressure through means of a pressure sensing switch for example, to convert the pressure to an electric signal and to input it in the computing circuit 51. The computing circuit 51 has a function to compute whether the grinding wheel is to be moved forward or backward on the basis of the electric signal from the detecting circuit 50, to correct it by the correcting circuit 52 and to send a command to the fine adjustment drive motor 27.

Function will be described hereunder. Before commencing the grinding process, the grinding surface of the grinding wheel 1 has previously been adjusted to a position conforming to a dimension of workpiece, and the both sensors 35 & 36 have previously been adjusted to proper positions corresponding to the longitudinal edges of the annular groove 31 by turning the hand wheel 45 as illustrated in FIG. 3. Then, the grinding work is commenced.

In the grinding process wherein the workpiece is ground in turn, the position of grinding wheel deviates to the front side as illustrated by FIG. 4 when the rotating shaft 5 expands due to heat. In this instance, the second sensor 36 deviates from a rear edge 31b of the annular groove 31 and the second sensor 36 approaches an outer peripheral surface of the base metal 2, so that an air pressure of the second sensor 36 rises. On the other hand, an air pressure of the first sensor 35 does not change.

The pressure change of said second sensor 36 is detected by the detecting circuit 50 and converted into an electric signal to be inputted in the computing circuit 51, and the computing circuit 51 determines by said electric signal to move the position of grinding wheel to the backside and sends this command signal through the correcting circuit 52 to the motor 27.

The foregoing command signal drives the motor 27 which in turn moves the rotating shaft holder 6 and the rotating shaft 5 to the backside, and thereby moves the grinding wheel 1 to the backside.

When the grinding wheel 1 moves backward to the correct position as illustrated by FIG. 3, the second sensor 36 restores the original air pressure to stop the motor 27, thereby holding the grinding wheel 1 at the position of FIG. 3.

Further, when the rotating shaft 5 contracts to cause the grinding wheel to deviate backward due to factors such as cooling down of atmosphere etc., the other first sensor 35 approaches the outer peripheral surface of the base metal 2 so that the air pressure of the first sensor 35 becomes higher to cause the rotating shaft 5 to move forward and the grinding wheel 1 to return to its original position.

OTHER EMBODIMENT (1) Non-contact switches such as a proximity switch are used for the first and second sensors 35 & 36 and installed in the manner as facing on the annular groove 31 of the base metal 2. Namely, with reference to FIGS. 1-4, the both sensors (proximity switches) 35 & 36 are in an OFF-state in FIG. 3. But, when the base metal 12 moves forward due to thermal expansion of the rotating shaft 5 and the outer peripheral surface of the base metal 2 approaches the second sensor (second proximity switch) as illustrated by FIG. 4, the second sensor 36 becomes an ON-state. This state is detected by the detecting circuit 50 of FIG. 1, the computing circuit 51 determines to move the rotating shaft 5 to the backside, the command signal is sent through the correcting circuit 52 to the motor 27, the rotating shaft 5 is moved backward to return the grinding wheel 1 to its original position.

(2) An embodiment shown by FIG. 5 is an example wherein sectional configurations of edges 31a and 31b in front and rear of the annular groove 31 are formed into sloped faces opening radially and outwardly to enable measurement of displacement of the grinding wheel 1 by the use of the sensors 35 & 36 forming the air gauges.

A pressure, which is generated when the sensors face on an longitudinal end part P1 of a bottom face of the annular groove 31 (when a distance is d1), is specified as a standard pressure. In case when the grinding wheel 1 deviates to the front side, the rear edge 31b of the annular groove 31 approaches the second sensor 36 in proportion to its forward displacement f, so that the air pressure of the second sensor 36 becomes higher and the other first sensor 35 is kept at the standard pressure. Namely, the opponent spot of the second sensor 36 changes from a point P1 to a point P2 and the spraying distance changes to d2. The air pressure of the second sensor 36 changes in proportion to or corresponding to the forward displacement f of the grinding wheel 1, the increase in the air pressure is measured by the detecting circuit 50 of FIG. 1, and the displacement of grinding surface of the grinding wheel 1 is detected and converted into the electric signal to be inputted in the computing circuit 51. The computing circuit 51 in turn computes a backward moving distance of the rotating shaft 5, the correcting circuit 52 corrects the computed value, then the command is sent to the motor 27 to move the rotating shaft 5 backward.

(3) In a structure having inclining edges 31a & 31b in the annular groove 31 as shown by FIG. 5, capacitance type non-contact switches may be used for the first and second sensors 35 & 36.

When the grinding wheel 1 deviates to the front side for example, a capacitance of the second sensor 36 increases in proportion to the axial displacement so that the axial displacement of the grinding wheel 1 can be detected from the change of capacitance.

Further, in a structure having inclining edges 31a & 31b in the annular groove 31 as shown by FIG. 5, an electromagnetic induction type non-contact switches may be used for the first and second sensors 35 & 36. In this case, the axial displacement of the grinding wheel 1 can be detected from the changes of electric current and electric voltage.

(4) FIG. 6 is an embodiment wherein both front and rear edges 31a & 31b of the annular groove 31 are formed into sloped faces and at the same time a laser displacement gauge 53 irradiating laser beam on the front edge 31a is installed as the sensor.

The laser displacement gauge 53 is equipped with a semiconductor laser drive circuit 55, a semiconductor laser 56, a projector lens 57, a receiver lens 58, a beam position detection element 59 and amplifiers 61 & 62 etc. A position where a beam is irradiated on the front edge 31a of the grinding wheel as illustrated by a solid line of FIG. 6, is set to a reference position.

When the grinding wheel 1 changes its position to the front side as illustrated by an imaginary line, for example, a spot on the beam position detection element 59 moves from T1 to T2. This spot displacement is detected by the detecting circuit 50 of FIG. 1, and converted into an electric signal to be inputted in the computing circuit 51. A necessary backward movement of the rotating shaft 5 is computed by the computing circuit 51 and corrected by the correcting circuit 52, and its command is sent to the motor 27. Thus, the rotating shaft 5 is moved backward to return the grinding wheel to its original position.

(5) The present invention may be applicable to a duplex head surface grinding machine equipped with a pair of grinding wheels 1 & 1' facing each other as illustrated by solid and imaginary lines of FIG. 1. Also in this case, it is required to equip the annular groove 31 and the detecting means 33 only to one side grinding wheel 1. Especially when a thin workpiece (having a thickness of 2 mm or smaller) is ground by the duplex head surface grinding machine, the displacement can not be measured by the conventional direct grinding wheel measurement system because the sensor can not be put between the grinding wheels. However, the object of the invention can be fully accomplished in this case because the measurement system according to this present invention does not incur such a trouble.

(6) The illustrated embodiment shows the horizontal type having the horizontal rotating shaft 5, however, the present invention may be applicable to a vertical type surface grinding machine having a vertical rotating shaft 5.

EFFECT OF THE INVENTION

As described above, in the surface grinding machine according to the present invention equipped with the super-grain grinding wheel developing an extremely little wear; the annular groove 31 is formed on the outer peripheral surface of the base metal 2, the sensors 35 & 36 measuring the longitudinal position of the annular groove 31 are disposed in a manner as radially outwardly facing on said annular groove 31 with spaces leaving therebetween, and the grinding wheel position is detected by measuring the position of the annular groove 31 (the position of the grinding surface). Therefore, the following advantages become obtainable.

(1) It is not required to make the sensors contact directly with the grinding surface or have it face on the grinding surface; so that greater part of effects of the coolant or ground chips on the sensors can be avoided, possibilities of producing errors due to such factors can be eliminated, and troubleproof, correct and stable measurement of displacement becomes possible.

(2) Since the annular groove 31 is formed on the outer peripheral surface of the base metal 2 and the sensors are disposed at the radial outside of the base metal 2, it is quite unnecessary to install the components for detecting means (such as the touch probe etc.) on the grinding surface, so that installation and inspection of the sensor can be done easily.

What is claimed is:

1. In a surface grinding machine wherein a super-grain grinding wheel composed of a base metal fastened to a longitudinal end portion of a rotating shaft and a super-grain layer provided on a longitudinal end face of said base metal is utilized for a grinding surface; a grinding wheel position detecting means comprising: an annular groove formed in an outer peripheral surface of the base metal, said annular groove having a cross section partially defined by a pair of longitudinally spaced edges with at least one of said edges normal to the axis of rotation of said shaft, and a sensor for detecting a longitudinal position of the annular groove is located near said one edge of said groove and spaced radially outwardly from and facing said outer peripheral surface of said base metal, whereby the position of said grinding wheel is detected by sensing movement in the position of said one edge of the annular groove.

2. A grinding wheel position detecting means for a surface grinding machine as set forth in claim 1, further including a fine adjustment means for moving the rotating shaft in an axial direction, a processing means, means connecting said sensor to said signal processing means and means connecting said signal processing means to said fine adjustment means, whereby said signal processing means, on receipt of a signal from the sensor indicative of movement of said one edge of the annular groove sends a command signal to said fine adjustment means so as to control movement of the rotating shaft and grinding wheel to a desired position.

3. A grinding wheel position detecting means for a surface grinding machine as set forth in any one of claim 1 or claim 2, wherein said sensor is comprised of an air gauge and air is sprayed from said air gauge to the annular groove so that a displacement of the grinding wheel can be detected by a change of air pressure.

4. A grinding wheel position detecting means for a surface grinding machine as set forth in claim 3, wherein both of said longitudinally spaced edges of the annular groove are normal to the axis of rotation of said shaft and two sensors comprising air gauges are spaced radially outwardly from and facing said outer peripheral surface of said base metal with each of said sensors located near one of said longitudinally spaced edges of said annular groove.

5. A grinding wheel position detecting means for a surface grinding machine as set forth in any one of claim 1 or claim 2, further including a pair of sensors spaced radially outwardly from and facing said outer peripheral surface of said base metal, both of said longitudinally spaced edges of the annular groove are normal to the axis of rotation of said shaft and said pair of sensors comprise two proximity switches with each proximity switch located near one of said longitudinally spaced edges of said annular groove.

6. A grinding wheel position detecting means for a surface grinding machine as set forth in claim 1, wherein said annular groove is further defined by a bottom surface normal to said one of said longitudinally spaced edges of said groove, said sensor is an air gauge spraying air into said groove adjacent said one of said longitudinally spaced edges of said groove and further including means responsive to an abrupt change in air pressure when the outer peripheral surface of said base metal contiguous to said one longitudinally spaced edge of said groove disrupts said air sprayed into said groove to reposition said grinding wheel.

* * * * *